United States Patent
Fukuda

(10) Patent No.: US 6,470,765 B1
(45) Date of Patent: Oct. 29, 2002

(54) SYNCHRONOUS MESH-TYPE AUTOMATIC TRANSMISSION CONTROL DEVICE

(75) Inventor: Takehisa Fukuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/898,057

(22) Filed: Jul. 5, 2001

(30) Foreign Application Priority Data

Oct. 10, 2000 (JP) .......................................... 2000-309824
Feb. 2, 2001 (JP) .......................................... 2001-027214

(51) Int. Cl.$^7$ ............................................. F16H 59/00
(52) U.S. Cl. ..................................................... 74/336 R
(58) Field of Search ........................................ 74/336 R

(56) References Cited

U.S. PATENT DOCUMENTS 6,226,584 B1 * 5/2001 Carlson ........................ 701/51

FOREIGN PATENT DOCUMENTS

JP          63-270252          11/1988

* cited by examiner

*Primary Examiner*—Dirk Wright
(74) *Attorney, Agent, or Firm*—Sughrue Mion, PLLC

(57) ABSTRACT

The present invention provides a synchronous mesh-type automatic transmission control device for an automotive vehicle capable of stably shortening a transmission time, and simultaneously having a high durability.

The control system comprises an input shaft 13 coupled with a crank shaft 1a of an internal combustion engine 1 through a clutch mechanism 2, an output shaft 16 coupled with the input shaft 13 through any one set of gears selected from the plural sets of transmission gears 17 to 21 each having a different gear ratio, a coupling mechanism 22 for coupling the input shaft 13 with the output shaft 16 by selecting one set of gears as above-mentioned, a shift and select actuator 5 for controlling a shift position and a select position of the coupling mechanism 22, and a control means 4, whereby a manipulating value of the shift and select actuator 5 is controlled by inputting its position signal, and moreover, a shift speed of the shift and select actuator 5 is controlled according to a rotating speed difference signal of the input shaft 13 and the output shaft 16 of the internal combustion engine 1.

4 Claims, 5 Drawing Sheets

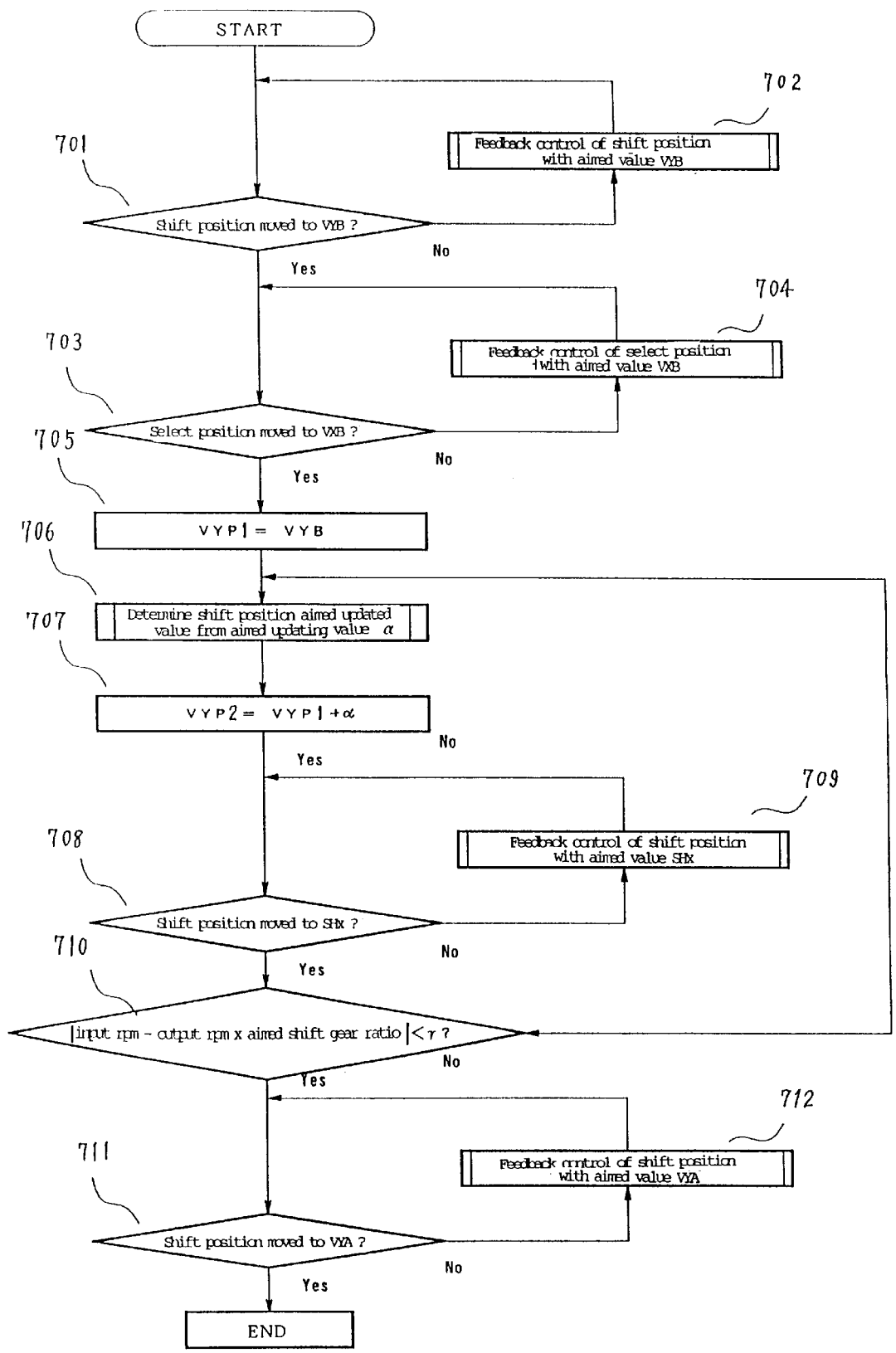

SYNCHRONOUS MESH-TYPE AUTOMATIC TRANSMISSION CONTROL DEVICE

1. TECHNICAL FIELD

The present invention relates to an automatic transmission control device, and more particularly to a synchronous mesh-type automatic transmission control device for an automotive vehicle wherein, a stabilization of an operating time at changing a speed and a durability of a synchronizing mechanism are capable of being realized.

2. BACKGROUND ART

A synchronous mesh-type automatic transmission control device for a vehicle, for example, is disclosed in Japanese laid-open Patent No. 63-270252. In this prior art, an internal combustion engine and a synchronous mesh-type automatic transmission are coupled through an electromagnetic clutch. In changing a transmission gear, a throttle opening is controlled to maintain a difference of a rotating speed of the internal combustion engine between when a electromagnetic clutch is released and coupled within a predetermined permissible range. At the same time, a relation between the rotating speed of the internal combustion engine and the throttle opening is compensated by a learning routine program at each speed changing operation to cope with any variations of the engine characteristics and an operating condition, thus making it possible to reduce a shock when the gear is changed.

The synchronous mesh-type automatic transmission as shown in the above prior art, a pair of three position oil pressure cylinders for manipulating a shift and select lever along an axial and rotating direction are used for selecting a shift rod by driving a select three position oil pressure cylinder, for moving the selected shift rod by driving a shift three position oil pressure cylinder, and then for switching a transmission stage. In addition to the synchronous mesh-type automatic transmission driven by an oil pressure as explained above, an electric synchronous mesh-type automatic transmission with two motors for a shift and select driving operation is generally used.

In the electric synchronous mesh-type automatic transmission, a gear change operation for coupling the aimed gears is controlled in the following manner. A coupling means to be operated is selected by a select actuator while a select position is being controlled by a position signal of a select position sensor, and the coupling means is transferred for coupling the aimed gears by a shift actuator while a shift position is being controlled by a position signal of a shift position sensor. Namely, a control of the shift actuator is executed in a way, wherein the shift and select position is controlled to coincide with an aimed shift and select position by controlling a driving variable based on a deviation signal as a parameter between the aimed shift and select position and an actual shift and select position detected by the shift and select position sensor. In controlling the shift actuator and the select actuator, it is a a usual way to employ a PID control method with a position feedback, wherein P, I and D are respectively a proportional, an integral and a derivative element.

In the synchronous mesh-type automatic transmission according to the prior art, wherein a transmission gear stage is changed by controlling a shift and select position, the shift and select position are controlled to the aimed preset shift and select position. But in this prior device, as a control speed by the shift and select position was fixed, a driving feeling was not so good, and there was also a feeling of something wrong as well as a prolonged shifting time caused by a variation in an using environment, a driving condition, constitutional parts and the manipulated variable required for a shift operation due to a time lapse. Moreover, if the shift operation is fastened for reducing a time of changing the speed to cope with the above mentioned shortcomings, another problem arises, wherein a synchronizing mechanism for obtaining a synchronous rotation deteriorates in performance.

SUMMARY OF THE INVENTION

In view of the above, it is the object of the present invention to provide a synchronous mesh-type automatic transmission control device for an automotive vehicle capable of stably shortening a time for a speed changing operation and, at the same time, having a high durability.

According to this invention a synchronous mesh-type automatic transmission control device comprising an input shaft coupled with a crank shaft of an internal combustion engine through a clutch, a coupling mechanism including plural transmission sets, wherein each transmission set has a pair of transmission units with a different transmission ratio to each other, a select and shift actuator for selecting one of said plural transmission sets based on a select position and for selecting one of said pair of transmission units in the selected one of said plural transmission sets based on a shift position, an output shaft coupled with said input shaft through the selected one of said pair of transmission units in the selected one of said plural transmission sets, a select and shift position sensor for outputting a select position signal according to said select position of said select and shift actuator and a shift position signal according to said shift position of said select and shift actuator, and a control means for generating a driving signal varied on a rotating speed difference of said input shaft and said output shaft and for (diving said select and shift actuator by an operating speed based on said driving signal.

According to the synchronous mesh-type automatic transmission control device in this invention, as the operating speed for the select and shift actuator is configured to be varied based on the rotating speed difference between the input and the output shaft, the time required for the speed change operation is capable of being stably shortened independent of the variations in using environment, operating conditions or constitutional parts, and the control device having the synchronizing mechanism with high reliability and durability is capable of being provided.

Furthermore, the synchronous mesh-type automatic transmission control device, wherein said control means controls said operating speed so that the operating speed at the large value of the rotating speed difference is larger than the operating speed at the small value of the rotating speed difference.

According to the synchronous mesh-type automatic transmission control device in this invention, as the larger is the rotating speed difference of the input and the output shaft, the larger the shift operating speed by the select and shift actuator is controlled. Similarly, the smaller is the rotating speed difference of the input and the output shaft, the smaller the shift operating speed by the select and shift actuator is controlled. Thereby durability of the synchronizing mechanism is capable of being effectively raised.

Moreover, the synchronous mesh-type automatic transmission control device, wherein said each transmission set has a sleeve gear for selecting one of said pair of transmission units and said control means controls the operating speed of said sleeve gear according to the rotating speed difference of said input shaft and said output shaft when said sleeve gear is moved from a neutral position to the position according to said one of said pair of transmission units.

In the synchronous mesh-type automatic transmission control device according to the present invention, wherein said each transmission set has the sleeve gear for selecting one of said pair of transmission units and said control means controls the operating speed of the sleeve gear according to the rotating speed difference of the input and the output shaft. Therefore, durability of the synchronizing mechanism is capable of being promoted In addition, the synchronous mesh-type automatic transmission control device, wherein said control means controls the operating speed of said sleeve gear so that the operating speed at the large value of the rotating speed difference is larger than operating speed at the small value of in the rotating speed difference.

Furthermore, as the operating speed of the sleeve gear is controlled to be high or low by the control means respectively depending on whether the rotating speed difference of the input and the output shaft is large or small, durability of the synchronizing mechanism is capable of being effectively promoted.

BRIEF DESCRIPTION OF THE DRAWINGS

FIG. 7 is a functional flowchart for explaining an operation of the synchronous mesh-type automatic transmission control device in the embodiment 1 according to the present invention.

DETAILED DESCRIPTION OF THE PREFERRED EMBODIMENT

Figure 1:
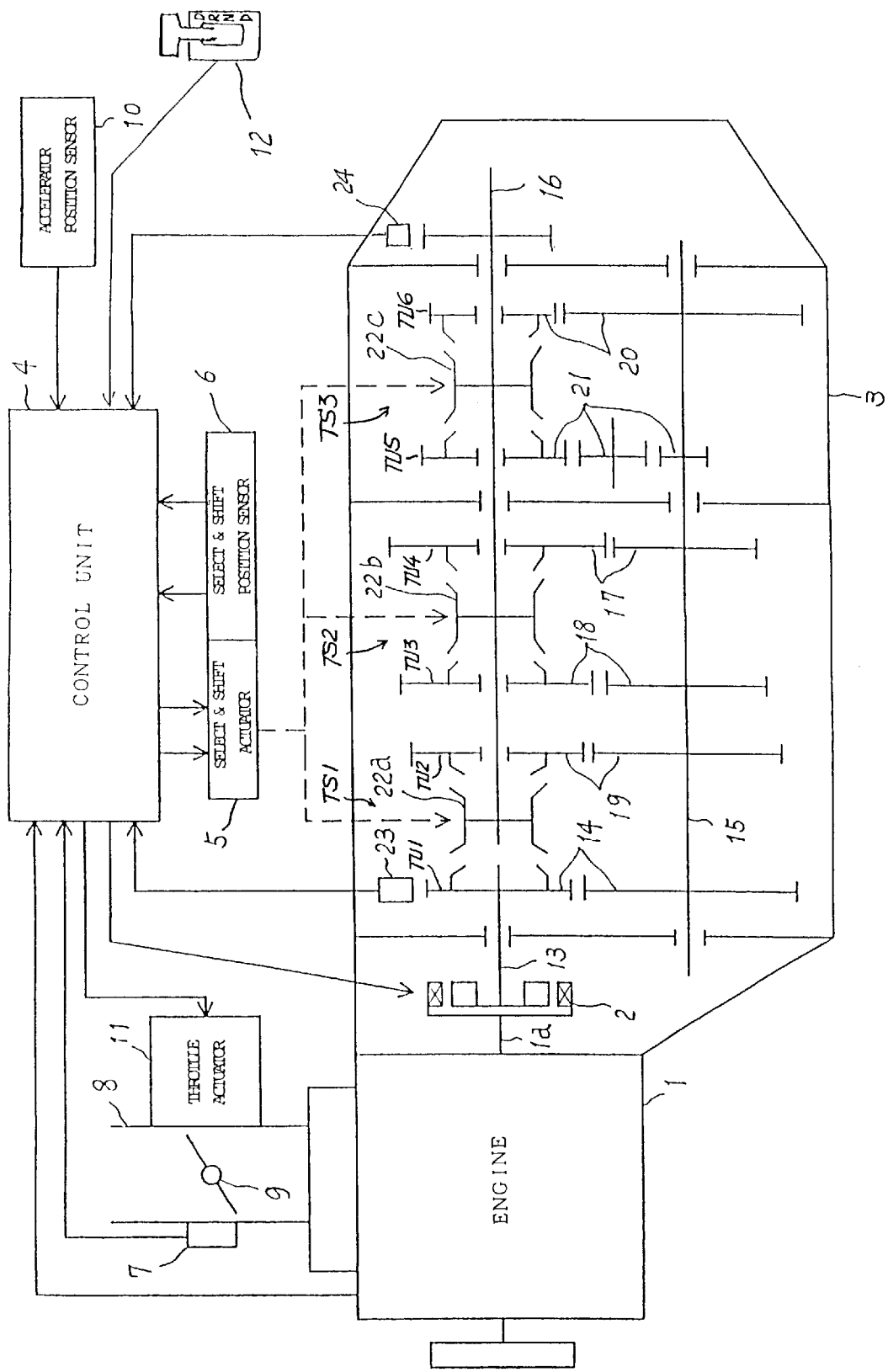
FIG. 1 is a configuration of a synchronous mesh-type automatic transmission control device in an embodiment 1 according to the present invention.
Figure 2:
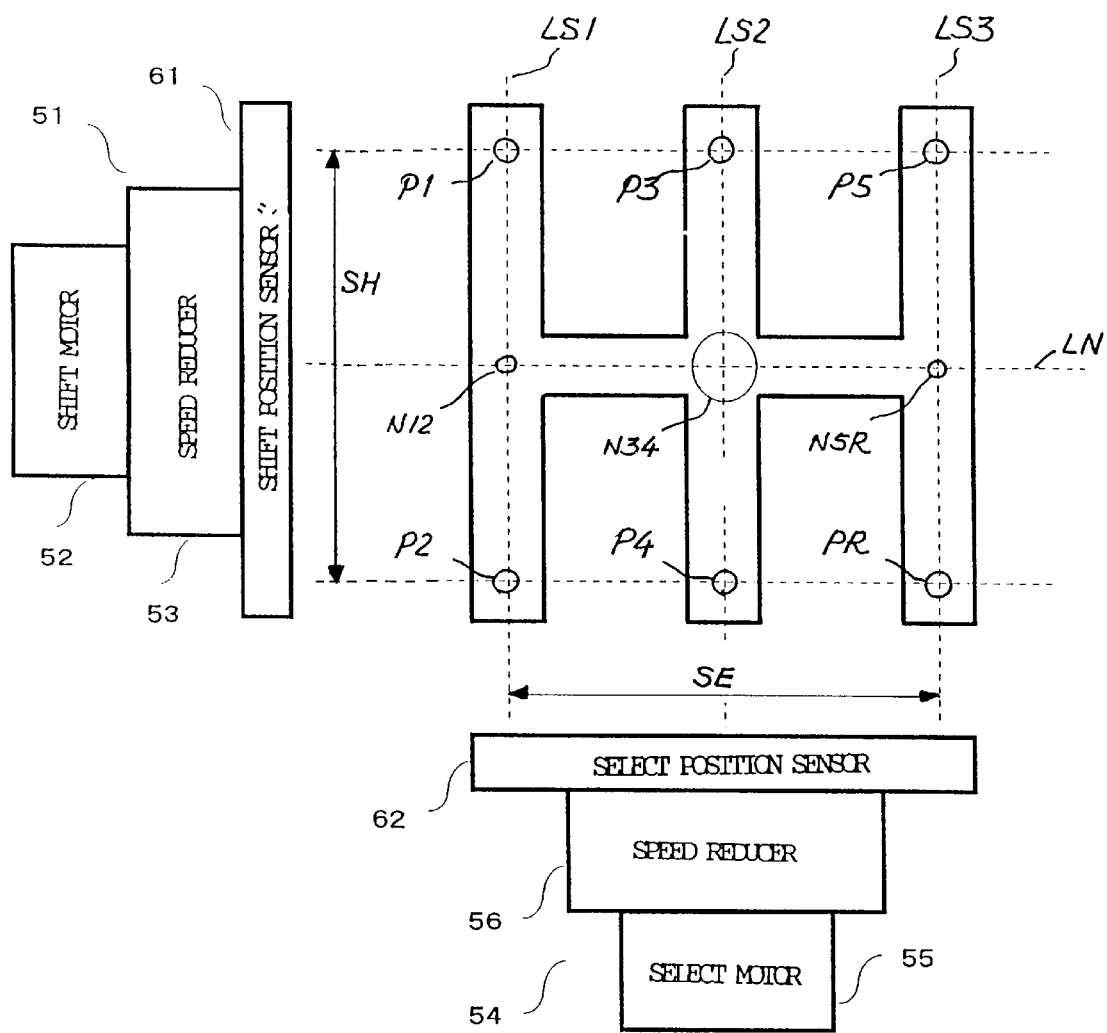
FIG. 2 is a configuration for explaining a speed change mechanism of the synchronous mesh-type automatic transmission control device in the embodiment 1 according to the present invention.
Figure 3:
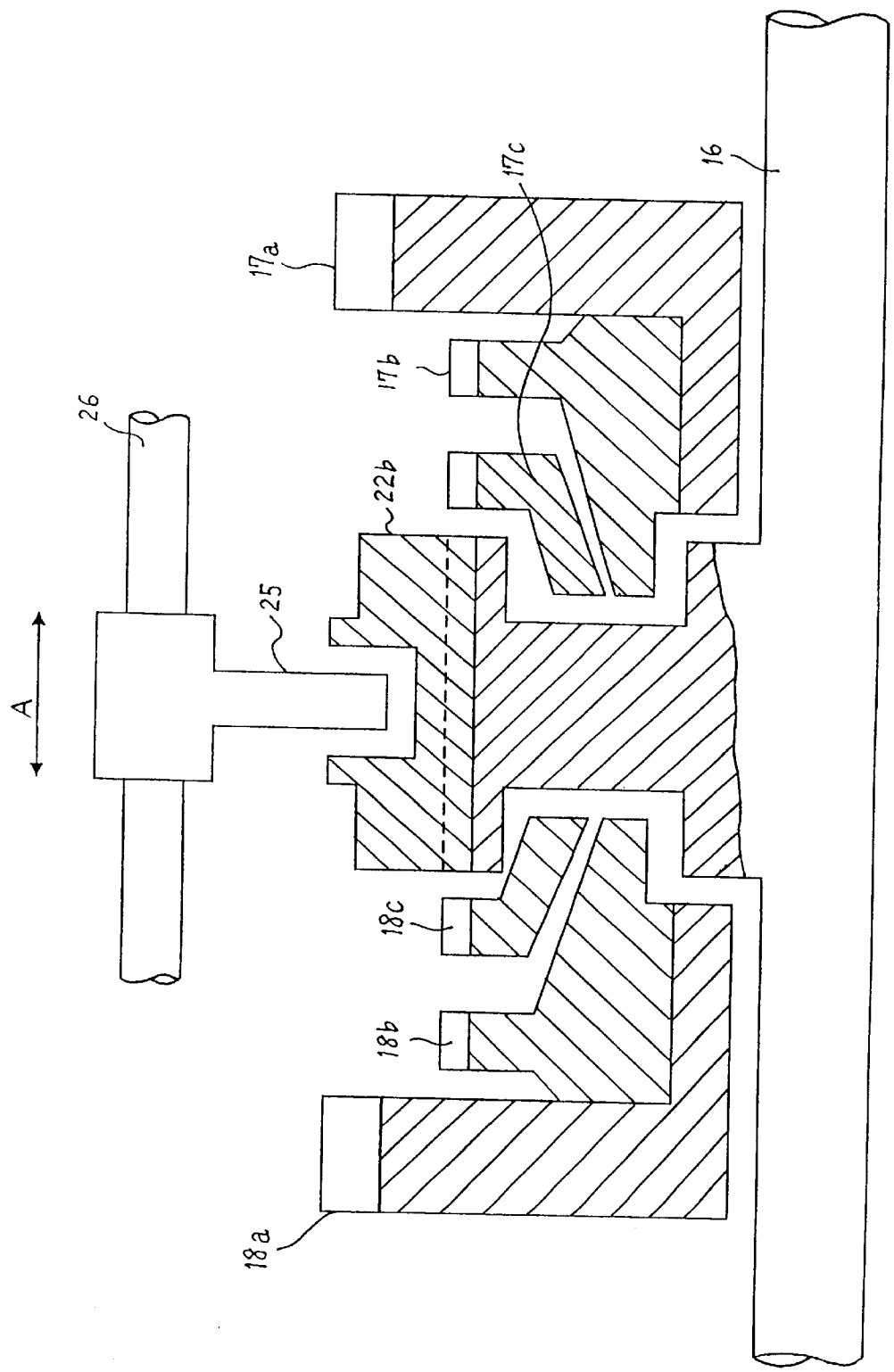
FIG. 3 is a configuration for explaining a synchronous mechanism of the synchronous mesh-type automatic transmission control device in the embodiment 1 according to the present invention.
Figure 4:
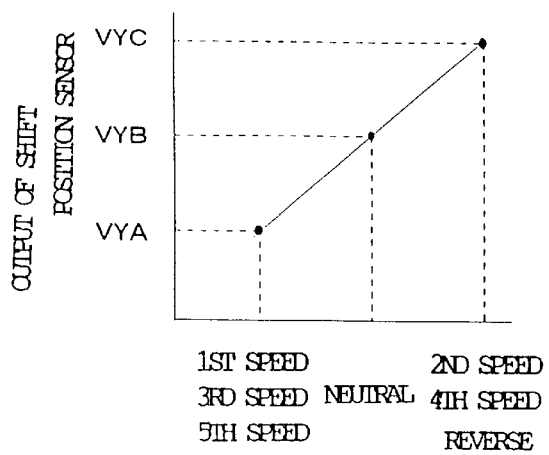
FIG. 4 is a graph for explaining a shift operation of the synchronous mesh-type automatic transmission control device in the embodiment 1 according to the present invention.
Figure 5:
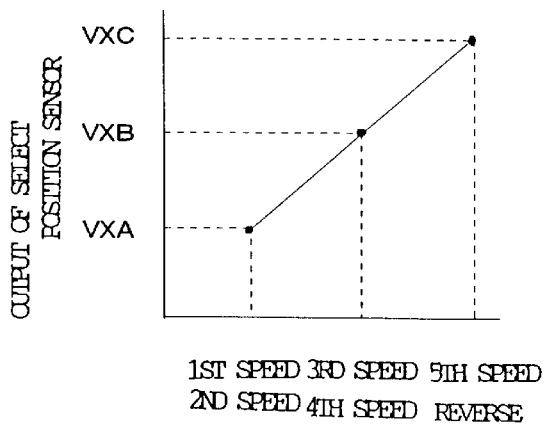
FIG. 5 is a graph for explaining a select operation of the synchronous mesh-type automatic transmission control device in the embodiment 1 according to the present invention.
Figure 6:
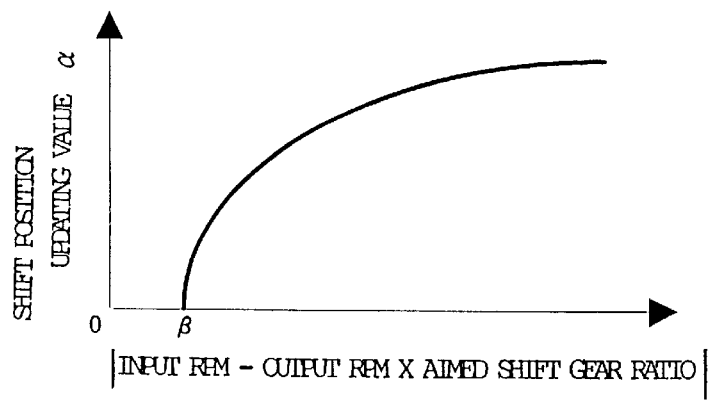
FIG. 6 is a characteristic curve for explaining a renewed value of a shift position of the synchronous mesh-type automatic transmission control device in the embodiment 1 according to the present invention.

FIG. 1 to FIG. 7 are for explaining a configuration and an operation of a synchronous mesh-type automatic transmission control device in an embodiment 1 according to the present invention. Namely, FIG. 1 is for explaining a configuration of a synchronous mesh-type automatic transmission control device, FIG. 2 is for explaining a speed change mechanism, FIG. 3 is for explaining a configuration of a synchronous mechanism, FIG. 4 and FIG. 5 are for explaining a shift and a select operation, FIG. 6 is a characteristic curve of a renewed aimed shift position and FIG. 7 is a flowchart for explaining a control operation. In FIG. 1, an internal combustion engine 1 is laden in an automotive vehicle, an electro-magnetic clutch 2 set up with a crank shaft 1a of the internal combustion engine 1 is for coupling the internal combustion engine 1 with the synchronous mesh-type automatic transmission 3, a control unit 4 as a control means is for controlling the synchronous mesh-type automatic transmission 3, a select and shift actuator 5 controlled by the control unit 4 as a control means is for manipulating a gear coupling of the synchronous mesh-type automatic transmission 3 to be described in detail later on, and a select and shift_position sensor 6 is for detecting a manipulated position of the select and shift actuator 5.

Furthermore, a throttle position sensor 7 located on an intake 8 of the internal combustion engine 1 is for detecting an opening of a throttle valve 9, an accelerator position sensor 10 is for detecting a position of a stepped-down accelerator not shown in the drawings, a throttle actuator 11 is for manipulating the opening of the throttle valve 9 according to an output from the accelerator position sensor 10 or based on a stored program of the control unit 4 when a speed shift operation takes place, and a shift lever 12 is for commanding a shift operating position by a driver to the control unit 4.

The synchronous mesh-type automatic transmission 3 comprises an input shaft 13 coupled with the electro magnetic clutch 2, a counter shaft 15 coupled with the input shaft 13 through a primary gear set 14, an output shaft 16 for driving an automotive vehicle. The synchronous mesh-type automatic transmission 3 also comprises three transmission sets TS1, TS2, TS3. The transmission set TS1 includes a pair of transmission unit TU1, and TU2. The transmission unit TU1 has the primary gear set 14, and the transmission unit TS2 has a $3^{rd}$ speed gears set 19. The transmission set TS2 includes a pair of transmission unit TU3 and TU4. The transmission unit TU3 has a $2^{nd}$ speed gear set 18, and the transmission unit TU4 has a $1^{st}$ speed gear set 17. The transmission set TS3 includes a pair of transmission unit TU5 and TU6. The transmission unit TU5 has a reverse gear set 21 and the transmission unit TU6 has a $5^{th}$ speed gear set 20. The $1^{st}$ speed gear set 17, the $2^{nd}$ speed gear set 18, the $3^{rd}$ speed gear set 19, the $5^{th}$ speed gear set 20 and the reverse gear set 21 installed respectively as a pair of gears between the counter shaft 15 and the output shaft 16. Each of the transmission set TS1, TS2 and TS3 has a sleeve gear 22a, 22b and 22c as a coupling mechanism which is fixed to the output shaft 16 in a rotating direction and are simultaneously installed to be movable to an axial direction of the output shaft 16. The sleeve gear 22a is selectively coupled with the gear set 14 or 19, by its movement on axis direction of the output shaft 16. As a same, the sleeve gear 22b and 22c are selectively coupled with the gear set 18 or 17 and with the gear set 21 or 20. The synchronous mesh-type automatic transmission 3 is also configured, wherein one gear on a side of the counter shaft 15 of each gear set of 17, 18, 19, 20 and 21 is fixed with the counter shaft 15, the other gear on a side of the output shaft 16 of each gear set of 17, 18, 19, 20 and 21 is installed free of rotation to the output shaft 16, and is fixed separately with the output shaft 16 by coupling with the sleeve gear 22a, 22b or 22c.

An input shaft rotating speed sensor 23 is for detecting a rotating speed of the input shaft 13, and an output shaft rotating speed sensor 24 is for detecting a rotating speed of the output shaft 16. Moreover, the electro-magnetic clutch 2 controlled by the control unit 4 generates a transmission torque proportional to its exciting current, and transfers or cuts off power between the crank shaft 1a of the internal combustion engine 1 and the input shaft 13 of the synchronous mesh-type automatic transmission 3.

An operation of the synchronous mesh-type automatic transmission 3 controlled by the select and shift actuator 5 is outlined in the configuration of FIG. 2. The select and shift actuator 5 comprises a shift actuator 51 and a select actuator 54. The select actuator 54 comprises a select motor 55 and a speed reducer 56, and selects the sleeve gear 22a, 22b or 22c to be moved by detecting a select position based on a signal of a select position sensor 62.

The shift actuator 51 comprises a shift motor 52 and a speed reducer 53, and shifts the selected sleeve gear 22a, 22b or 22 by detecting a shift position based on a signal of a shift position sensor 61. When the sleeve gear 22a is selected by the select actuator 54, the shift actuator 51 shifts the sleeve gear 22a to selectively couple with the primary gear set 14 or the $3^{rd}$ speed gear set 19. When the sleeve gear 22b is selected by the select actuator 54, the shift actuator 51 shifts the sleeve gear 22b to selectively couple with the $2^{nd}$ speed gear set 18 or the $1^{st}$ speed gear set 17. When the sleeve gear 22c is selected by the select actuator 54, the shift actuator 51 shifts the sleeve gear 22c to selectively couple with the reverse gear set 21 or the $5^{th}$ speed gear set 20.

The gear set 17, 18, 19 and 20 respectively having a different gear ratio are for advancing, and a configuration of 5-stage advancing with 1-stage reversing is shown as an example in the embodiment 1. The sleeve gear 22a, 22b and 22c fix the gear sets 17, 18, 19, 20 and 21 separately with the output shaft 16. Namely, the sleeve gear 22a is installed between the primary gear set 14 and the $3^{rd}$ speed gear set 19, the sleeve gear 22b is installed between the $1^{st}$ speed gear set 17 and the $2^{nd}$ speed gear set 18, and the sleeve gear 22c is installed between the $5^{th}$ speed gear set 20 and the reverse gear set 21. Next, any one of the sleeve gear 22a 22b or 22c is selected by the select actuator 54, and is transferred to its either side, wherein any one of the $1^{st}$ to the $5^{th}$ speed gear for advancing, the reverse gear or a neutral position is selected.

The operation of the synchronous mesh-type automatic transmission 3 is to be explained more in detail referring again to FIG. 2. In this FIG. 2 the synchronous mesh-type automatic transmission 5 has three shift lines of LS1, LS2 and LS3 in a vertical direction. A first shift line LS1 includes the $1^{st}$ speed position P1 for advancing in the upper end and the $2^{nd}$ speed position P2 for advancing in the bottom position, and the corresponding speed position P1 and P3 are selected by the sleeve gear 22b being transferred. A second shift line LS2 includes the $3^{rd}$ speed position P3 and the $4^{th}$ speed position P4 for advancing respectively in its upper end and in the bottom position, and the corresponding speed position P3 and P4 are selected by the sleeve gear 22a being transferred Similarly, a third shift line LS3 includes the $5^{th}$ speed position P5 and the reverse speed position PR respectively in the upper end and in the bottom position, and the corresponding speed position P5 and PR are selected by the sleeve gear 22c being transferred.

The select actuator 54 selects any one of the sleeve gear 22a, 22b and 22c by driving a select motor 55 and a speed reducer 56. In FIG. 2 an arrow SE shows a movable range and direction of the select actuator 54, which selects any one of the first shift line LS1, the second shift line LS2 and the third shift line LS3 by moving in the movable range. After any one of the shift lines is selected by the select actuator 54, the shift actuator 51 is activated, wherein the shift actuator 51 transfers any one of the sleeve gear 22a, 22b and 22c along any one of the shift line LS1, LS2 and LS3 for selecting any one of the speed position required from P1, P2, P3, P4, P5 and PR. In FIG. 2 an arrow SH shows a movable range and direction of the shift actuator 51, and a neutral line LN is assumed just in the middle of the movable range SH. The neutral line NL includes a neutral position N12, N34 and N5R which are respectively an intersection with the shift line LS1, LS2 and LS3. At the neutral positions of N12, N34 and N5R, the sleeve gear 22a, 22b and 22c are located just in the middle of the gear set on both sides without providing any speed positions.

Here, a case of the speed shift operation from the $2^{nd}$ to the $3^{rd}$ speed position is picked up as an example for explaining an operating process in the following. As the sleeve gear 22b is in the $2^{nd}$ speed position selected by the select actuator 54, firstly the sleeve gear 22b is returned to the neutral position N12, then the sleeve gear 22a is selected by the select actuator 54 to be transferred to a side of the $3^{rd}$ speed gear set 19 by the shift actuator 51, and other sleeve gears excluding 22a are set to the neutral position. Additionally, in the configuration shown in FIG. 1, the primary gear set 14 and the output shaft 16 are to be coupled by the sleeve gear 22a when the $4^{th}$ speed position is selected, and all sleeve gears 22a, 22b and 22c do not link with any gear sets at the neutral positions.

FIG. 3 is a configuration for explaining the speed shift operation of the synchronous mesh-type automatic transmission 3 picked up from FIG. 1, wherein the $1^{st}$ speed gear set 17, the $2^{nd}$ speed gear set 18 and the sleeve gear 22b between the two speed gear sets 17 and 18 are shown. In this FIG. 3, a $1^{st}$ speed gear 17a of the $1^{st}$ speed gear set 17 is installed free of rotation on a side of the output shaft 16, and a $2^{nd}$ speed gear 18a of the $2^{nd}$ speed gear set 18 is also installed free of rotation on the side of the output shaft 16. A synchronizer cone 17b and 18b are fixed respectively to the $1^{st}$ speed gear 17a and the $2$nd speed gear 18a. A synchronizer ring 17c and 18c are fixed free of rotation respectively to the synchronizer cone 17b and 18b, and transfer a friction torque respectively by contacting with a surface of each cone pressed respectively by the synchronizer cone 17b and 18b. A shift fork 25 is selected by the select actuator 54, and moves along a shaft 26 toward the $1^{st}$ speed gear l7a or the $2^{nd}$ speed gear 18a for transferring the sleeve gear 22b to thee speed position or the $2^{nd}$ speed position, wherein a moving direction of the sleeve gear 22b is indicated as an arrow A:

For example, when the $1^{st}$ speed position is selected by the select and shift actuator 5, the sleeve gear 22b transferred to the $1^{st}$ speed position side by the sift fork 25, and is coupling with the synchronizer ring 17c and the synchronizer cone 17b. Therefore, a rotation of the $1^{st}$ speed gear 17a is transferred to the out put shaft 16 through the synchronizer cone 17b and the sleeve gear 22b. When a command to change a speed from the $1^{st}$ speed to the $2^{nd}$ speed is generated, the shift actuator 51 moves the shift fork 25 to the $2^{nd}$ speed side, and a coupling of the sleeve gear 22b and the synchronizer 17b is released Then, the sleeve gear 22b is transferred pressing synchronizer ring 18c to the synchronizer cone 18b after the sleeve gear 22b is returned to the neutral position, and a coupling of the sleeve gear 22b and the synchronizer cone 18b is made by letting the $2^{nd}$ speed gear 18a rotate in synchronizing with the output shaft 16. The above mentioned operation is carried out with the electromagnetic clutch 2 is disconnected, and the operation is completed when the electromagnetic clutch 2 is connected after the sleeve gear 22b and the synchronizer cone 18b are coupled.

FIG. 4 shows a relationship between a shift position and an output voltage of the shift position sensor 61, and FIG. 5 shows a relationship between a select position and an output voltage of the select position sensor 62. The shift position sensor 61 outputs a voltage VYA when the sleeve gear 22a, 22b and 22c are at the $1^{st}$, the $3^{rd}$ or the $5^{th}$ speed position respectively indicated by P1, P3 and P5, and the voltage VYA becomes an aimed position voltage during a shift control operation by the control unit 4. A voltage VYB becomes the aimed position voltage when the sleeve gear 22a, 22b and 22c are at the neutral position indicated by N12, N34 and NSR. Similarly, a voltage VYC output by the shift position sensor 61 becomes the aimed position voltage used by the control unit 4 when the sleeve gear 22a, 22b and 22c are at the $2^{nd}$, the $3^{rd}$ or the reverse speed position respectively indicated by P2. P4 and RP. Furthermore, the select position sensor 62 generates a voltage VXC to be used as an aimed position voltage when the sleeve gear 22c is selected for switching between the $5^{th}$ speed and the reverse speed position. In the same way, a voltage VXB or a voltage VXA is output and used as the aimed position voltage respectively according to when the sleeve gear 22a is selected for switching between the $3^{rd}$ and the $4^{th}$ speed position or when the sleeve gear 22b is selected for switching between the $1^{st}$ and the $2^{nd}$ speed position.

The speed shift operation by the control unit 4 is executed, wherein a position signal of a shift lever 12, a signal of the accelerator position sensor 10, the rotating speed signals of the input shaft rotating speed sensor 23 and the output shaft rotating speed sensor 24, and a rotating speed signal of the internal combustion engine are input to the control unit 4. Then, according to these signals, the control unit 4 determines a transmission stage suitable for the running conditions based on a stored shift pattern program, and controls the shift and select actuator 5 while detecting the shift and the select position by the shift and select position sensor 6.

In this operation, a power of the synchronous mesh-type automatic transmission 3 is made to be off by cutting off the exciting current of the electro-magnetic clutch 2, and as explained in FIG. 3, the sleeve gear 22a, 22b or 22c is selected by giving an operational command to the shift and select actuator 5 for coupling a newly determined gear set after releasing a coupling of an old gear set of the transmission stage, and the electromagnetic clutch 2 is reconnected when a completion of the new coupling is detected from a signal of the shift and select position sensor 6. During the operating process, an opening of the throttle 9 is decreased when the electromagnetic clutch 2 is off, and at the reeoupling of the electro-magnetic clutch 2, the opening of the throttle 9 is increased to a predetermined position based on the rotating speed of the internal combustion engine 1 and the signal of the output shaft rotating speed sensor 24.

In the synchronous mesh-type automatic transmission control device heretofore explained in the embodiment 1, the control unit 4 controls the speed shift position as is shown in the flowchart in FIG. 7. Moreover, a case of an operation of shifting from the $2^{nd}$ to the $3^{rd}$ speed position is shown in this FIG. 7 as an example. If the control unit 4 judges from the running condition that the $3^{rd}$ speed gear is more suitable while running with the $2^{nd}$ speed gear, whether or not the shift position is moved to the neutral position N12 is firstly judged from whether or not a shift position voltage of the shift position sensor 61 is equal to VYB in step 701.

If the shift position is not yet moved in step 701, the feed back control is executed for the shift position to be moved to the neutral position N12 by repeating step 701. If the shift position is moved to the neutral position N12, a process advances to step 703, wherein whether or not the sleeve gear 22b corresponding to the $3^{rd}$ and $4^{th}$ speed position is selected by, the select actuator 54 is judged based on detecting a select position voltage VXB. In this case if the voltage VXB is detected, the sleeve gear 22b of the transmission 3 is in a selected state, wherein the sleeve gear 22b can be judged to be at the neutral position N34 as a shift position voltage is equal to VYB. the $3^{rd}$–$4^{th}$ speed position is selected by the select actuator 54 from a detected position voltage of the select position VXB.

If the $3^{rd}$–$4^{th}$ speed position is not selected by the select actuator 54, a feedback control is made for the select position to be transferred to the $3^{rd}$–$4^{th}$ speed position in step 704, and the process returns to step 703. In this case, the process advances to step 705 if the $3^{rd}$–$4^{th}$ speed position is finished to be selected. In step 705, a shift drive signal VYP1 is set for driving the shift actuator 51. In this example, a signal level of the shift drive signal VYP1 is set equal to that of a shift position voltage at the neutral position VYB. In step 706 an updating value α of the shift drive signal VYP1 is determined from a rotating speed difference of the input shaft rotating speed sensor 23 and the output shaft rotating speed sensor 24. The updating value α is set as shown in FIG. 6 for the rotating speed difference of the input and the output shaft. Namely, when a value of the rotating speed difference multiplied by a gear ratio of the aimed shift position, which in this case is the $3^{rd}$ speed position P3, is larger than a judging values β, the larger is the difference of the rotating speed, the larger the updating value α becomes. Here, the judging value β is predetermined based on a detection mirror and a value of a dead band of the rotating speed difference.

In step 707 the updating value a determined in step 706 is added to the signal level of the shift drive signal VYP1 set up in step 705, and a shift drive signal VYP2 is computed based on (VYP1+α) as a new signal level. The shift drive signal VYP2 is delivered to the shift motor of the shift actuator 51, and this signal is kept being delivered to the shift motor 52 until the shift actuator 51 arrives at a position SHx a distance x apart from the neutral position N34, wherein the distance x is equivalent to a value of the shift drive signal VYP2 multiplied by a predetermined time t0, VYP2Xto. The predetermined time t0 is a unit time, and is obtained by equally dividing a required time T0 by a factor of M. And the required time T0 is a time for the sleeve gear 22b to move from the neutral position N34 to the aimed speed position, that is, the $3^{rd}$ speed position P3 in this case. Therefore, a fine control in a gear change operation is achievable if a large value of M is adopted. In step 708 whether or not a shift position has reached the position SHx=VYP2t0 as the aimed shift position is judged, and if this is not the case, a feedback control is repeated in step 709. If this is the case, a value of the rotating speed difference of the input and the output shaft multiplied by the gear ratio of aimed shift position which is the $3^{rd}$ speed position P3, in this example, is compared with a judging value γ in step 710, and if the value is larger than γ, the updating value α of the shift drive signal is reset by returning to step 706 for repeating from step 706 to 710.

In steps from step 706 to 710 which is an operating process from the neutral position N34 to the $3^{rd}$ speed position P3, firstly the updating value α of the shift drive signal VYP1 is determined, wherein the shift drive signal VYP1 is a shift drive signal from the neutral position N34 to the position SHx a distance x apart from the neutral position N34 toward the $3^{rd}$ speed position P3, and the shift drive signal VYP2 corresponding to the position SHx is set. Then, the transfer operation is carried out to move the sleeve gear 22b to the position SHx based on the shift drive signal VYP2. As above mentioned, the position SHx is a moving distance of the sleeve gear 22b in the unit time t0, and the smaller is the unit time t0, the more finely the shift control is executed. Every time the distance x is moved, the updating value α is newly determined, and the shift drive signal VYP2 is computed based on the updating value α. As is shown in FIG. 6, the larger is the rotating speed difference of the input and the output shaft, the larger the updating value α becomes, and also the larger the level of the shift drive signal VYP2 becomes. Accordingly, a transfer speed or operating speed of the sleeve gear 22a by the shift fork 25 becomes faster. By repeating steps from step 706 to 710, the sleeve gear 22a is transferred with a fast speed. In this transfer, when the synchronizer ring being pressed by the sleeve gear 22a comes in contact with the synchronizer cone, the synchronizing mechanism begins to work and the rotating speed difference of the input and the output shaft becomes smaller. Therefore, the updating value α also becomes smaller, and the meshing of the sleeve gear and the synchronizer cone is done. Thus, the updating value α becomes o and the shift operation comes to a halt when the rotating speed difference of the output and the input shaft becomes no larger than β.

Namely, the transfer speed or operating speed of the sleeve gear is fast when it starts the neutral position, and the sleeve gear begins a synchronizing rotation faster with pressing the synchronizer ring to the synchronizer cone. And once the synchronous rotation begins, the transfer speed or operating speed becomes smaller, thus a shock of a frictional transfer from the synchronizer ring and coupling at meshing with the synchronizer cone is alleviated. The judging value γ in step 710 is a value for Judging whether or not the speed shift operation is made to a predetermined position, and when a value of the rotating speed difference multiplied by the gear ratio of the aimed shift position, namely the $3^{rd}$ speed position P3, becomes smaller than the judging value γ, it is judged that the shift operation to the predetermined position is completed, and a step advances to step 711. In step 711 whether or not the shift position has become the $3^{rd}$ speed position is judged from whether or not an output of the shift position sensor 61 is equal to VYA. And if this is not the case, a process advances to step 712, wherein the feedback control with VYA as the aimed position is continued for returning to step 711 until the shift position becomes VYA, and the speed shift operation is completed.

A process of the speed shift operation heretofore explained as an example is similarly applicable to other cases such that when any one of the sleeve gear 22a, 22b and 22c is transferred from the neutral position N12, N34 or N5R to the speed position P1, P2, P3, P4, P5 or PR. In this shift operation of the sleeve gears, the larger the difference is the rotating speed difference of the input and the output shaft, the faster the transfer speed of the sleeve gears become, and the speed is slowed down when the synchronizing mechanism begins to function. Thus, a time required till the synchronizing rotation is completed is shortened, and resultantly a shock to the synchronizer rings, the synchronizer cones and the sleeve gears is capable of being minimized.

What is claimed is:

1. A synchronous mesh-type automatic transmission control device comprising:

an input shaft coupled with a crank shaft of an internal combustion engine through a clutch, a coupling mechanism including plural transmission sets, wherein each transmission set has a pair of transmission units with a different transmission ratio to each other, a select and shift actuator for selecting one of said plural transmission sets based on a select position and for selecting one of said pair of transmission units in the selected one of said plural transmission sets based on a shift position, an output shaft coupled with said input shaft through the selected one of said pair of transmission units in the selected one of said plural transmission sets, a select and shift position sensor for outputting a select position signal according to said select position of said select and shift actuator and a shift position signal according to said shift position of said select and shift actuator, and a control means for generating a driving signal varied on a rotating speed difference of said input shaft and said output shaft and for driving said select and shift actuator by an operating speed based on said driving signal.

2. The synchronous mesh-type automatic transmission control device claimed in claim 1, wherein said control means controls said operating speed so that the operating speed at the large value of the rotating speed difference is larger than the operating speed at the small value of the rotating speed difference.

3. The synchronous mesh-type automatic transmission control device claimed in claim 1, wherein said each transmission set has a sleeve gear for selecting one of said pair of transmission units and said control means controls the operating speed of said sleeve gear according to the rotating speed difference of said input shaft and said output shaft when said sleeve gear is moved from a neutral position to the position according to said one of said pair of transmission units.

4. The synchronous mesh-type automatic transmission control device claimed in claim 3, wherein said control means controls the operating speed of said sleeve gear so that the operating speed at the large value of the rotating speed difference is larger than operating speed at the small value of the rotating speed difference.

* * * * *